[22.] Daniel Davis. Imp't in Wheels for Carriages etc.
No. 118,590. Patented Aug. 29, 1871.
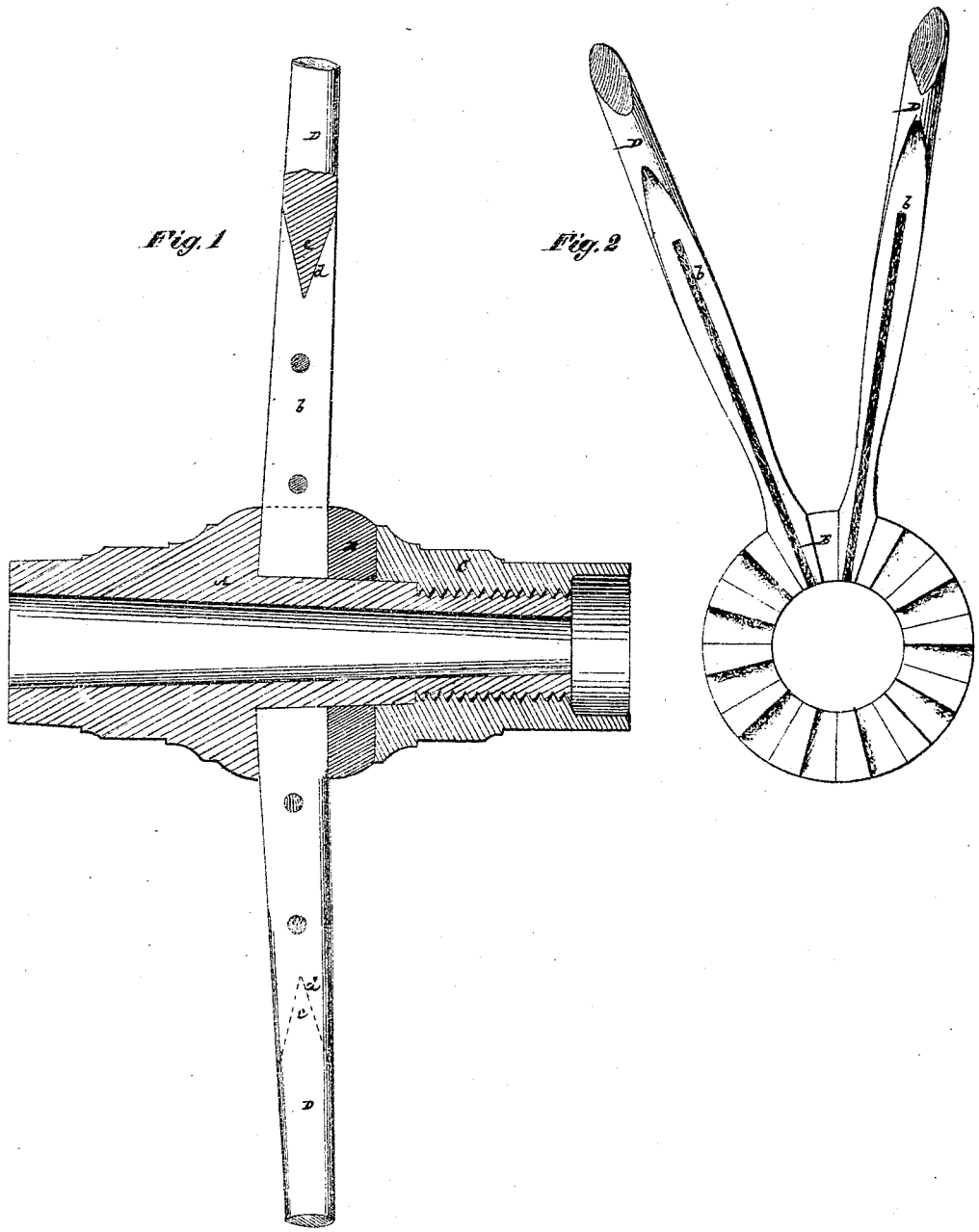
Witnesses,
Fred Haynes
R. F. Rabeau
Daniel Davis

UNITED STATES PATENT OFFICE.

DANIEL DAVIS, OF NEW YORK, N. Y., ASSIGNOR TO THE DAVIS PATENT HUB AND WHEEL COMPANY, OF SAME PLACE.

IMPROVEMENT IN WHEELS FOR VEHICLES.

Specification forming part of Letters Patent No. 118,590, dated August 29, 1871.

*To all whom it may concern:*

Be it known that I, DANIEL DAVIS, of the city, county, and State of New York, have invented a new and useful Improvement in Wheels for Carriages and other vehicles or purposes, of which the following is a full, clear, and exact description, reference being had to the accompanying drawing forming part of this specification, and in which—

Figure 1 represents a section, taken longitudinally through its axis, of a wheel, in part constructed in accordance with my improvement; and Fig. 2, an inside face view of the collar portion of the hub which receives the inner ends of the spokes, and with two of the spokes as fitted therein.

Similar letters of reference indicate corresponding parts in both figures.

My invention relates to wheels having wooden spokes, preferably fitted into and carried by metal hubs; and consists in a combination of interior metal splines with the inner ends or portions of the spokes, whereby the spokes are not only strengthened and may be made lighter and are prevented from being marred or bruised by being clamped into the hub, but the same may be arranged closer or in greater number without staggering, in a wheel of given size, and a lighter and neater wheel generally is produced.

Referring to the accompanying drawing, A represents the body of a metal hub; B, a loose metal collar portion thereof, recessed to receive the butt-ends of the spokes within it, and serving, on screwing up an outside nut or sleeve, C, to clamp and hold the spokes between it and the body A. The spokes D, which are made of wood, have inserted within them thin metal splines $b$, preferably of steel, arranged to extend from the inner ends of the spokes up within them for a given distance of their length and throughout their width, so that, on forcing up the collar B by the screw-nut or sleeve C to clamp and hold the spokes in place, pressure is brought to bear upon the edges of the splines, and thus all danver of the wooden spokes being marred or injured by the act of securing them in the metal hub is avoided. The splines $b$ may be entered within the spokes by saw-cuts made in the latter from their opposite edges, and so as to leave a wedge-shaped termination, $c$, in the body of the spoke at the outer end of the slot or saw-cuts in it. The outer ends of the splines, having a wedge-shaped recess, $d$, in them to correspond, are then slid or driven up into the spokes from their butt or inner ends till the wedge $c$ of the spoke enters the recess $d$ in the spline. This construction serves to hold the splines from play or slip edgewise, and to more effectually brace the spoke, and may, to a greater or lesser extent, dispense with rivets passing through the splines and spokes, and which, when in any number, weaken the spokes. A wheel having a light metal hub and wooden spokes may, by the addition of the splines $b$, be made neater, stronger, and lighter without risk of the spokes being injured by clamping them in the hub, and by the lightness of the spokes, thus stiffened or protected, admitting of a considerable number of spokes being carried by a small-sized hub without resorting to a staggered arrangement of them.

What is here claimed, and desired to be secured by Letters Patent, is—

1. The combination of the metal splines $b$ with the wooden spokes D, substantially as specified.
2. The construction of the metal splines $b$ at their outer ends with a wedge-shaped recess, $d$, in combination with the wedges $c$ of the spokes, essentially as described.

DANIEL DAVIS.

Witnesses:
FRED. HAYNES,
HENRY T. BROWN.